Patented Sept. 16, 1947

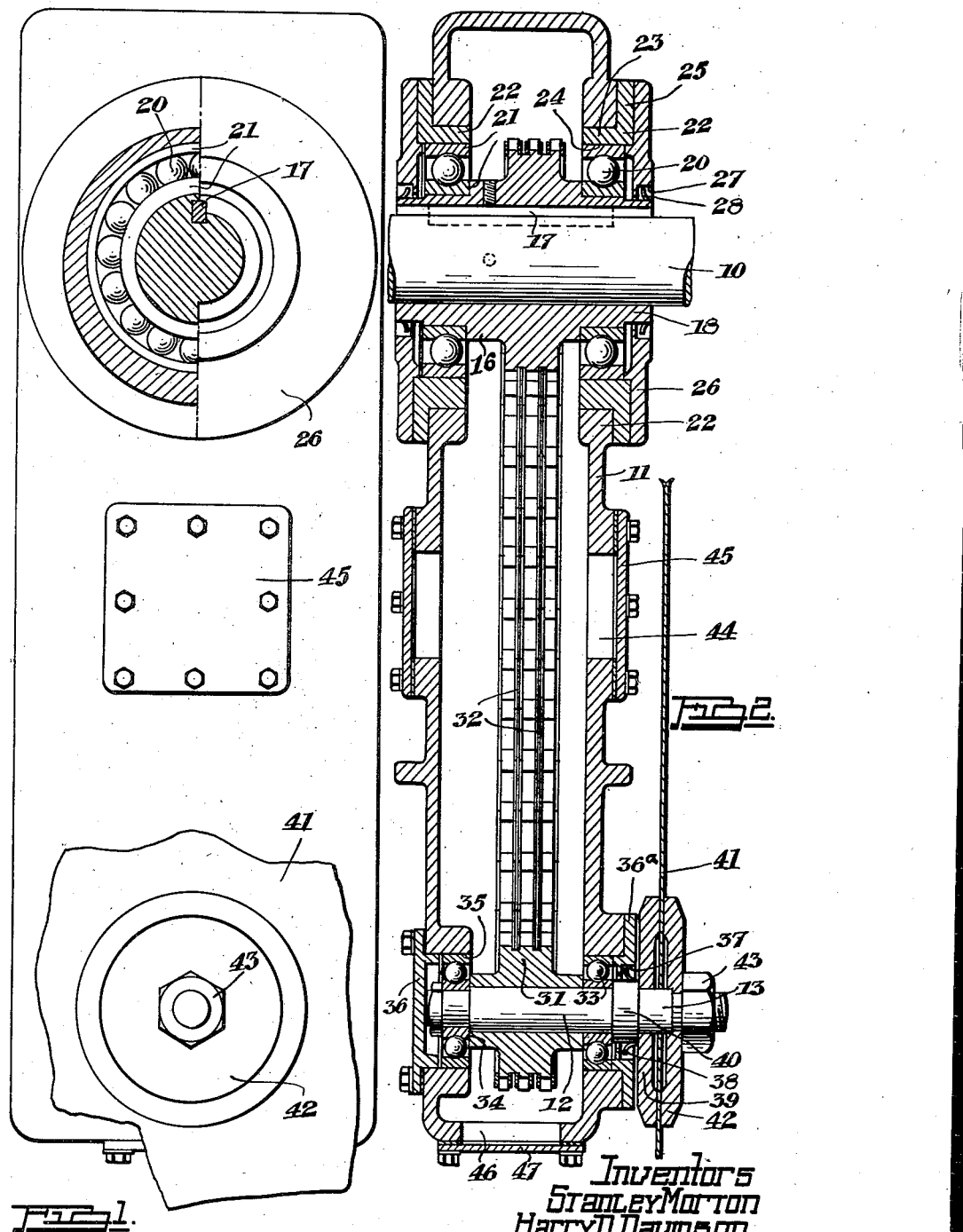

2,427,470

UNITED STATES PATENT OFFICE 2,427,470

TRIM SAW ASSEMBLY

Stanley Morton, Vancouver, British Columbia, and Harry Draney Davidson, West Vancouver, British Columbia, Canada Application August 24, 1943, Serial No. 499,846
In Canada June 28, 1943

3 Claims. (Cl. 74—242.16)

This invention relates to improvements in trim saw assemblies.

An object of the present invention is the provision of a trim saw assembly in which the housing which carries the saw floats on the same bearing that drives the latter.

Another object is the provision of a trim saw assembly including extremely simple and effective means for tightening the driving connection between the power shaft and the arbor on which the saw is mounted.

A further object is the provision of a trim saw assembly requiring little space, whereby saws in a battery may be placed close together.

With these and other objects in view, the present invention consists essentially of a trim saw assembly comprising a power shaft, a housing pivotally mounted on the shaft, an arbor rotatably mounted in the housing spaced from the shaft, one end of said arbor projecting beyond the housing, means for forming a driving connection in the housing between the shaft and the arbour, means associated with the power shaft for adjusting the distance between said shaft and the arbour, and a trim saw mounted on the arbour outside the housing, as more fully described and illustrated by way of example in the following specification and the accompanying drawings, in which Figure 1 is a side elevation, partly in section, of a trim saw assembly, and Figure 2 is a vertical section taken substantially at right angles to Figure 1.

Referring more particularly to the drawings, 10 is a power shaft which is supported and rotated in the usual manner (not shown) and one or more frames or housings 11 are pivotally mounted on said shaft, one only of said frames or housings being illustrated in the drawings. This housing is preferably elongated and mounted adjacent one end on the power shaft, and it has an arbor 12 rotatably mounted therein adjacent its opposite end. The end 13 of said arbor projects beyond the housing, and its outer end is threaded, as shown. Any desirable means is provided for forming a driving connection in the housing between the power shaft and the arbor, and if desired, any suitable means may be provided for adjusting the distance between said power shaft and arbor. The preferred, but not the only, method of achieving these results will now be described.

A sprocket-wheel 16 is fixedly mounted on the shaft 10 in the housing in any suitable manner, such as, by means of a key 17 fitting into corresponding keyways in the wheel and the shaft. This sprocket-wheel has an extended hub 18 projecting outwardly from each end thereof. The housing 11 actually is mounted on the extended hubs and it is preferable to fit anti-friction bearing therebetween, such as ball bearings 20 in retainers 21. The housing may be carried directly by the bearings or, as shown, eccentric cartridges 22 may be interposed between the bearings and the housing at each side thereof. Each cartridge consists of a cylinder 23 with a circular bore 24 extending therethrough eccentrically in relation to its periphery, and a flange 25 on its outer end. The bores 24 fit over the retainers 21 of the bearings. The cartridges are rotatable relative to the housing and the extended hubs or the power shaft to shift the housing in relation to the latter. The bearings are retained in place in any suitable manner, such as by end caps 26 fitting over the power shaft or, as illustrated, over the extended hubs to cover the bearings and cartridges. Each cap has a central opening 27 through which the shaft or the hubs extend, and oil seals 28 may be provided in these openings between the caps and the hubs or shaft.

Another sprocket-wheel 31 is fixedly mounted on the arbor 12 in the housing. One or more chains 32 form a driving connection between the sprocket-wheels 16 and 31. If desired, bearings 33 in retainers 34 may be placed between the arbor and the housing in openings 35 provided in the latter for this purpose, and end caps 36 and 36a cover the openings and the bearings. One of these caps as 36a has a central opening 37 therein through which the end 13 of the arbor projects. An oil seal 38 is provided in this opening between the arbor and the cap. A fixed collar 39 fixedly mounted on the end 13, bears against a shoulder 40 formed on the arbor, and a trim saw 41 against which a loose collar 42 bears, is firmly pressed against the fixed collar by a nut 43 which is threaded on to the outer end of the arbor.

Inspection openings 44 having covers 45 removably mounted thereon may be provided in the housing 11 between the shaft 10 and the arbor 12. Furthermore, an opening 46 having a cover 47 removably mounted thereon may be formed in the outer or free end of the housing.

In use, the rotation of the power shaft 10 is transferred to the arbor 12 through the chains 32, thus rotating the trim saw 41. The chains may be loosened or tightened by turning the cartridges 22. This causes the housing 11 and, consequently, the arbor to move longitudinally in relation to the power shaft so that the sprocket-wheels 16 and 31 are moved towards or away from each other. At the same time, the housing may be moved about the axis of the power shaft owing to the fact that it is or the cartridges are actually mounted on bearings which are concentric with the shaft.

The housing of this trim saw assembly floats on the bearing that drives the saw so that the bearing serves a double purpose. Furthermore, the driving connection between the power shaft and the saw may be quickly and readily adjusted without the necessity of removing any parts.

Various modifications may be made in this invention without departing from the spirit thereof or the scope of the claims and, therefore, the exact forms shown are to be taken as illustrative only and not in a limiting sense, and it is desired that only such limitations shall be placed thereon as are disclosed in the prior art or are set forth in the accompanying claims.

What we claim as our invention is:

1. A trim saw assembly comprising a housing, a sprocket wheel in the housing adapted to be fixedly mounted on a drive shaft, an extended hub on said wheel projecting outwardly from each side of the wheel, anti-friction bearings mounted on each hub, cartridges extending around each bearing and a cap extending over a bearing and cartridge also mounted on each hub, said housing having aligned apertures formed in one end, each adapted to engage a cartridge, whereby the housing is pivotally mounted with respect to the drive shaft.

2. A trim saw assembly as claimed in claim 1 in which each cartridge is formed having an outer cylindrical surface eccentric to a surface in contact with the anti-friction bearings, whereby rotatory adjustment of the cartridges adjusts the distance between the axis of the drive shaft and the housing.

3. A trim saw assembly as claimed in claim 1 in which the hubs extend laterally on each side of the sprocket wheel, each hub being formed with two stepped cylindrical surfaces, a corresponding anti-friction bearing being mounted on the inner stepped surface of each hub, and each cap being mounted on the outer stepped surface of each hub.

STANLEY MORTON.
HARRY DRANEY DAVIDSON.

REFERENCES CITED

The following references are of record in the file of this patent:

UNITED STATES PATENTS

| Number | Name | Date |
| --- | --- | --- |
| 449,957 | Simonds | Apr. 7, 1891 |
| 1,747,430 | Dorman | Feb. 18, 1930 |
| 1,783,362 | Goodspeed | Dec. 2, 1930 |
| 844,892 | Pfander | Feb. 19, 1907 |

FOREIGN PATENTS

| Number | Country | Date |
| --- | --- | --- |
| 473,771 | France | Oct. 12, 1914 |